US007041191B2

(12) United States Patent
Chen et al.

(10) Patent No.: US 7,041,191 B2
(45) Date of Patent: May 9, 2006

(54) METHOD FOR MANUFACTURING MEMBRANE ELECTRODE ASSEMBLY OF FUEL CELL BY PRINTING PROCESSES

(75) Inventors: Charn-Ying Chen, Taoyuan (TW); Peng Yang, Kaohsiung (TW); Ying-Sheng Lee, Sindian (TW); Kin-Fu Lin, Taipei (TW)

(73) Assignee: Institute of Nuclear Energy Research, Taoyuan (TW)

( * ) Notice: Subject to any disclaimer, the term of this patent is extended or adjusted under 35 U.S.C. 154(b) by 28 days.

(21) Appl. No.: 10/854,342

(22) Filed: May 27, 2004

(65) Prior Publication Data

US 2005/0276913 A1    Dec. 15, 2005

(51) Int. Cl.
  *B05D 5/12*    (2006.01)
  *H01M 4/86*    (2006.01)
  *H01M 4/90*    (2006.01)
(52) U.S. Cl. ............... 156/281; 156/277; 427/115; 427/125; 429/40; 429/44; 521/27
(58) Field of Classification Search .......... 156/277, 156/281; 427/115
  See application file for complete search history.

(56) References Cited

U.S. PATENT DOCUMENTS

| 4,655,886 | A | * | 4/1987 | Oda et al. .................. 205/524 |
| 5,415,888 | A | * | 5/1995 | Banerjee et al. ............ 427/125 |
| 5,547,911 | A | * | 8/1996 | Grot ........................... 502/101 |
| 5,752,988 | A | * | 5/1998 | Okamoto et al. ........... 29/623.5 |
| 5,869,202 | A | * | 2/1999 | Marchetti ................... 429/30 |
| 6,087,031 | A | * | 7/2000 | Iwasaki et al. .............. 429/33 |
| 6,180,276 | B1 | * | 1/2001 | Kim et al. ................... 429/41 |
| 6,391,487 | B1 | * | 5/2002 | Totsuka ....................... 429/41 |
| 6,500,217 | B1 | * | 12/2002 | Starz et al. ................. 29/623.5 |
| 6,514,561 | B1 | * | 2/2003 | Mallant et al. .............. 427/115 |
| 6,523,699 | B1 | * | 2/2003 | Akita et al. ................. 210/490 |
| 6,645,660 | B1 | * | 11/2003 | Datz et al. .................. 429/42 |
| 2002/0034675 | A1 | * | 3/2002 | Starz et al. .................. 429/42 |
| 2003/0064279 | A1 | * | 4/2003 | Yoshida et al. .............. 429/44 |
| 2003/0118890 | A1 | * | 6/2003 | Wittpahl et al. ............. 429/44 |
| 2004/0023104 | A1 | * | 2/2004 | Kohler et al. ............... 429/42 |
| 2004/0023105 | A1 | * | 2/2004 | Hohenthanner et al. ..... 429/44 |
| 2004/0081877 | A1 | * | 4/2004 | Kim et al. ................... 429/33 |
| 2004/0241519 | A1 | * | 12/2004 | Howard ...................... 429/33 |
| 2005/0014051 | A1 | * | 1/2005 | Loutfy et al. ............... 429/33 |
| 2005/0271923 | A1 | * | 12/2005 | Morishima et al. .......... 429/33 |

(Continued)

FOREIGN PATENT DOCUMENTS

| EP | 0 785 588 | * | 7/1997 |
| WO | 01/31725 | * | 5/2001 |

* cited by examiner (Continued)

*Primary Examiner*—Melvin Mayes
(74) *Attorney, Agent, or Firm*—Rosenberg, Klein & Lee

(57) ABSTRACT

A method for manufacturing membrane electrode assembly of fuel cell includes positioning an ion exchange membrane that is cleaned and trimmed to a predetermined size in advance to a base plate, mounting the base plate to a printing platform, attaching a printing plate to the platform, coating a catalyst solution on the printing plate with a scraper, printing the catalyst solution onto the ion exchange membrane with the scraper, heating the ion exchange with a heating board to a temperature of 70–80° C., and waiting for the ion exchange membrane to return flat to complete the coating of the catalyst solution on the ion exchange membrane. The printing and heating steps are repeated for both anode and cathode of the ion exchange membrane. The ion exchange membrane is further subject to hot pressing and then a piece of carbon cloth is positioned on the catalyst coating to serve as a diffusion layer. This completes the manufacturing of the membrane electrode assembly.

12 Claims, 5 Drawing Sheets

METHOD FOR MANUFACTURING MEMBRANE ELECTRODE ASSEMBLY OF FUEL CELL BY PRINTING PROCESSES

BACKGROUND OF THE INVENTION

1. Field of the Invention

The present invention relates generally to a manufacturing method for membrane electrode assembly of fuel cells, and in particular to a method for formation of membrane electrode assembly by printing processes so as to eliminate swelling and cracking of the membrane electrode assembly.

2. The Related Art

Fuel cells are an electro-chemical device that makes use of electrochemical reaction between a fuel containing hydrogen and an oxidizer, such as oxygen contained in the surrounding air, to generate electrical power. The fuel cells are advantageous in low contamination, high efficiency and high power density. Thus, developments and researches are intensively devoted to the fuel cell field for exploitation of the utilization thereof.

A typical fuel cell stack is made up of a structure comprising several layers of which an intermediate layer is constituted by an ion exchange membrane that allow for transmission/penetration of ions and two catalyst layers are positioned on opposite sides of the ion exchange membrane to serve as anode and cathode in which chemical reactions are carried out. Two gas diffusion layers are formed on outside surfaces of the catalyst layers, which are commonly made of carbon paper or carbon cloth. Reactants diffuse through the gas diffusion layers to reach the anode and cathode catalyst layers and the reaction products of the anode and cathode are released by diffusion through the diffusion layers. Two guide plates, which are made up of carbon boards, metal boards or graphite fiber composite material boards are mounted on outside surfaces of the diffusion layers. Gas guide channels are defined in the diffusion layers adjacent the guide plates for guiding the flow of the reactants and reaction products of the anode and cathode.

FIG. 1 of the attached drawings shows a cross-sectional view of a typical ion exchange membrane fuel cell. The fuel cell, designated with reference numeral 1, comprises a membrane electrode assembly (MEA) 10 made up of an ion exchange membrane 11 sandwiched between an anode catalyst layer 12 and a cathode catalyst layer 13. The anode of the membrane electrode assembly 10 comprises an anode-side gas diffusion layer 2 and an anode-side guide plate 3. The cathode of the MEA 10 comprises a cathode-side gas diffusion layer 4 and a cathode-side guide plate 5.

Also referring to FIG. 2, a practical fuel cell stack 100 is made up of a plurality of fuel cells 1 to which an anode collector board 61, an anode terminal board 62, a cathode collector board 63 and a cathode terminal board 64 are mounted by means of fasteners and airtight sealing. The fuel cell stack 100 further comprises air inlet and outlet 71a, 71b defined in the anode terminal board 62 to supply air that contains oxygen for the chemical reaction of the fuel cell stack 100. Hydrogen inlet and outlet 72a, 72b are defined in the anode terminal board 62 for supply of hydrogen for the reaction of the fuel cell stack 100. Coolant inlet and outlet 73a, 73b are also defined in the anode terminal board 62 for maintaining proper operation temperature of the fuel cell stack 100.

The MEA is the most important component of the ion exchange membrane fuel cell. Uniform coating of the catalyst layers on the opposite sides of the ion exchange membrane 11 plays an important role in the performance of the fuel cell. The materials that make up the MEA are often brittle and of high costs and thus the arrangement of a manufacturing process for the MEA is one of the key issues of the fuel cell manufacturing.

However, heretofore the catalyst layers are formed by spraying and such a spraying operation often causes repeated coating on local areas of the catalyst layers, which not only unnecessarily extends the manufacturing cycle of the MEA, but also leads to non-uniform coatings of the catalysts. This in turn makes variation of the local thickness, leading to unstable coating quality. Some conventional techniques may overcome such problems but they are not suitable for atomization of mass production.

In addition, the ion exchange membrane, upon coating of the catalyst layers, absorbs solvent of the sprayed catalyst solution, which causes swelling of the MEA and eventually leads to cracking of the catalyst layers.

Taiwan Patent Publication No. 447160 teaches how to treat the ion exchange membrane with solvents in order to overcome the deformation of the MEA induced in the coating operation. The ion exchange membrane is soaked in solvents, such as alcohol-based solvents, to cause pre-swelling. The catalyst is then uniformly coated on the surfaces of the membrane, which does not swell when contacting the coating solution. The coating is then dried and the ion exchange membrane shrinks back to uniform thickness to provide a high quality MEA. The MEA so formed is thereafter sandwiched between two gas diffusion layers and is further subject to heating and pressing to complete the manufacturing cycle thereof.

Taiwan Patent Publication No. 529195 also discloses treating the ion exchange membrane with solvents, wherein swelling is induced on the membrane by being treated with alcohol-based solvents. Catalyst is then coated on the membrane, which is in turn sandwiched between two gas diffusion layers. Thereafter, the semi-product is subject to heating and pressing to complete the manufacturing of the MEA. The swelling is done in a two-phase manner, in which two alcohol-based solvents are employed to treat the membrane respectively. For example, the membrane is first soaked in a monohydric alcohol solvent of high volatility and then treated with a polyhydric alcohol solvent of low volatility. Examples of the monohydric alcohol solvent include methyl alcohol, ethyl alcohol, propyl alcohol and mixtures thereof and examples of the polyhydric alcohol solvent include ethylene glycol, propylene glycol, butylenes glycol, glycerol and mixtures thereof.

However, the conventional methods involve complicated processes of treatment with alcohols, which to some extents do not completely solve the problems caused by swelling. Further, maintaining good quality control of such treatments is difficult. Thus, industrial utilization of such conventional methods is limited.

SUMMARY OF THE INVENTION

Thus, a primary object of the present invention is to provide a method for manufacturing a membrane electrode assembly of a fuel cell by printing processes.

Another object of the present invention is to provide a method for manufacturing a membrane electrode assembly of a fuel cell, which reduces local thickness variation and thus realizes enhanced control over thickness and size of the membrane in manufacturing.

A further object of the present invention is to provide a process of manufacturing membrane electrode assembly that allows for ready automatization.

Yet a further object of the present invention is to provide a method for manufacturing a membrane electrode assembly, which effectively overcomes swelling and cracking occurring in coating catalysts on the membrane.

To achieve the above objects, in accordance with the present invention, there is provided a method for manufacturing a membrane electrode assembly (MEA) of a fuel cell, comprising the steps of providing an ion exchange membrane that is cleaned in advance in a cleaning process and anode and cathode catalyst solution to be coated on anode and cathode side surfaces of the ion exchange membrane. The ion exchange membrane is trimmed to a predetermined size and is positioned on a thin base plate. The base plate is mounted to a printing platform. A printing plate, such as screen plate having predetermined pitch and mesh or a steel plate having a predetermined width and gap, is mounted to the printing platform. The catalyst solutions are uniformly coated on the printing plate with a scraper and then transferred and printed onto the side surfaces of the ion exchange membrane with the scraper. The ion exchange with the catalyst coated thereon is positioned on a heating board and heated to a temperature of 70–80° C. Upon completion of the heating step, the ion exchange membrane is removed from the heating board to wait for returning flat and the coating of the catalyst solution on the ion exchange membrane is completed. The printing and heating steps are repeated for both the anode and cathode of the ion exchange membrane.

In a preferred embodiment of the present invention, the ion exchange membrane is further subject to hot pressing and then a piece of carbon cloth is positioned on each catalyst coating to serve as a diffusion layer. This completes the manufacturing of the membrane electrode assembly.

The MEA provided by the method of the present invention is advantageous in that the MEA possesses catalyst layers of uniform thickness with small local thickness variation and uniform porosity. The method solves the problems of repeated coating on local areas of the catalyst layers, uncontrollable process time and non-uniform coating of catalyst layers in conventional spraying. The MEA made by the method of the present invention only has minor swelling which will vanish upon a short time. No cracking would happen to the MEA, and hence the MEA possesses stable and good quality. Moreover, the method is suitable for atomization of mass production, and highly promotes the efficient production of MEA.

BRIEF DESCRIPTION OF THE DRAWINGS

The present invention will be apparent to those skilled in the art by reading the following description of the best mode for carrying out the invention, with reference to the attached drawings, in which.

DETAILED DESCRIPTION OF THE PREFERRED EMBODIMENTS

The present invention discloses a method for manufacturing a membrane electrode assembly (MEA) of a fuel cell by printing. An MEA is comprised of an ion exchange membrane having opposite surfaces on which anode catalyst and cathode catalyst are coated respectively. In the method in accordance with the present invention, the ion exchange membrane is cleaned first in a cleaning process and anode catalyst solution and cathode catalyst solution are prepared in a catalyst solution preparation process before a printing operation for the formation of the MEA is performed. These processes will be described in details hereinafter.

Figure 1:
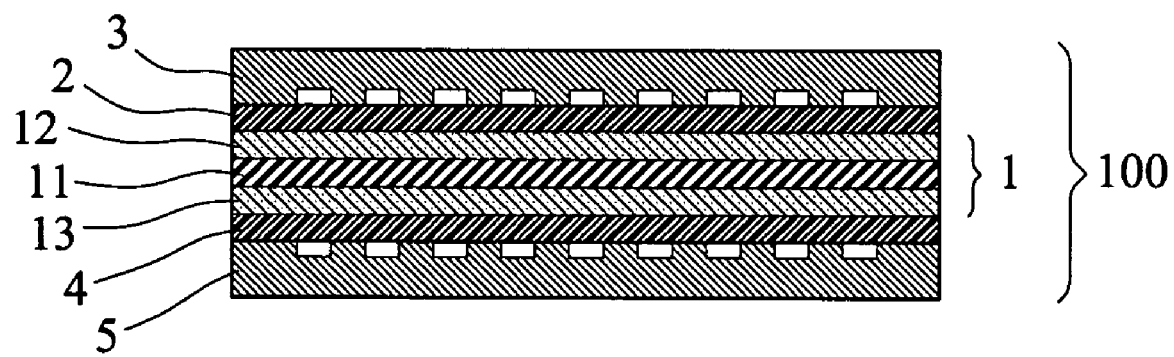
FIG. 1 is a cross-sectional view of a conventional ion exchange fuel cell.
Figure 2:
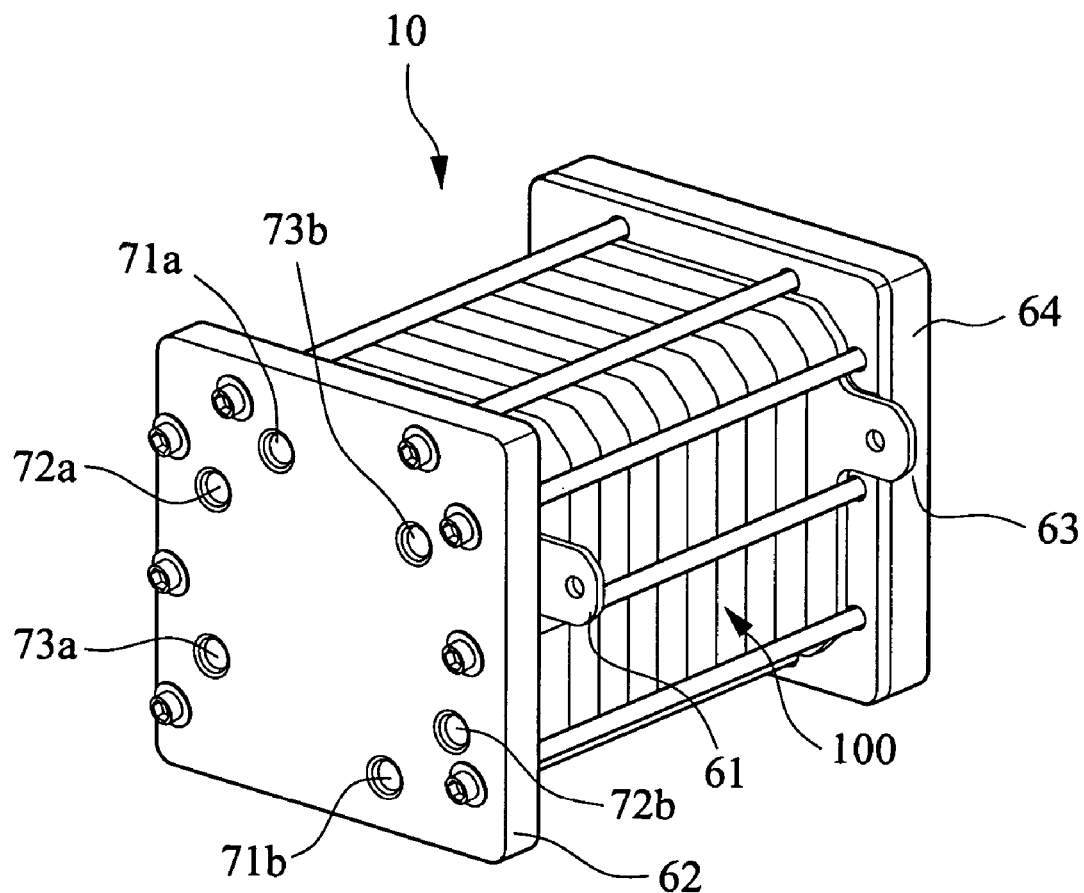
FIG. 2 is a perspective view of a fuel cell stack comprised of a plurality of fuel cells shown in FIG. 1 interposed between collector boards and terminal boards of anode and cathode.
Figure 3:
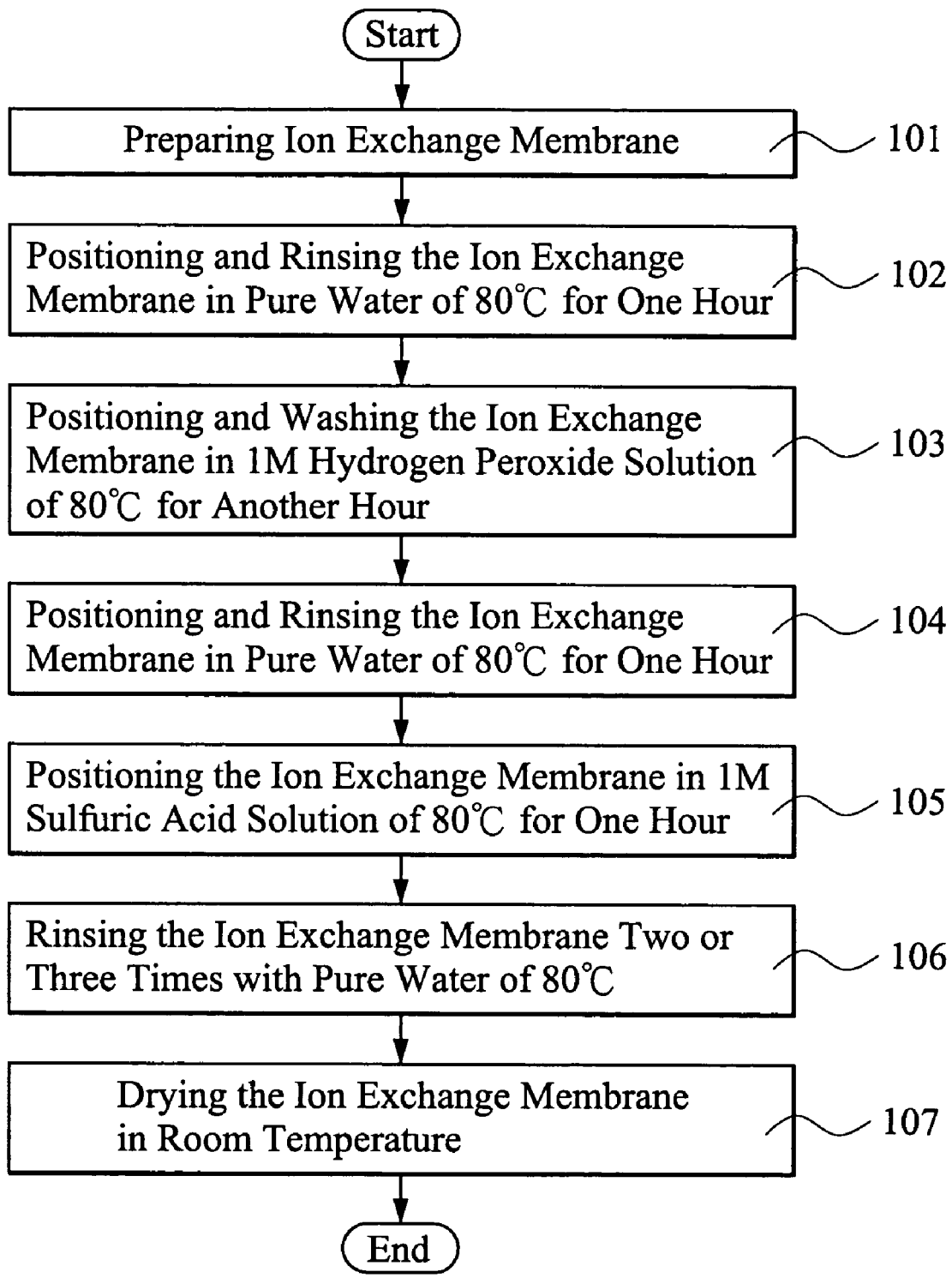
FIG. 3 is a flow chart illustrating a cleaning process of an ion exchange membrane in accordance with the present invention.

FIG. 3 shows the ion exchange membrane rinsing process. An ion exchange membrane is prepared first (step 101). A suitable example for the ion exchange membrane is Nafion® of Du Pont Corporation. A preferred example of the ion exchange membrane is Nafion 117 having a thickness of 175 µm, which is considered thick enough to block transmission/penetration of alcohol, serving as a solvent of the catalyst solutions, therethrough during the manufacturing process, which causes toxication to platinum that is commonly used as anode catalyst in the fuel cell. Effectively blocking the transmission/penetration of the alcohol through the ion exchange membrane to get into contact with the anode catalyst maintains the performance of the fuel cell.

The rinsing process comprises positioning and rinsing the ion exchange membrane in pure water of 80° C. for one hour (step 102), positioning and washing the ion exchange membrane in 1M hydrogen peroxide solution of 80° C. for another hour (step 103), positioning and rinsing the ion exchange membrane again in pure water of 80° C. for one hour (step 104), positioning the ion exchange membrane in 1M sulfuric acid solution of 80° C. for one hour (step 105) and completely rinsing the ion exchange membrane two or three times with pure water 80° C. (step 106). The so cleaned ion exchange membrane is then dried in room temperature (step 107).

Figure 4:
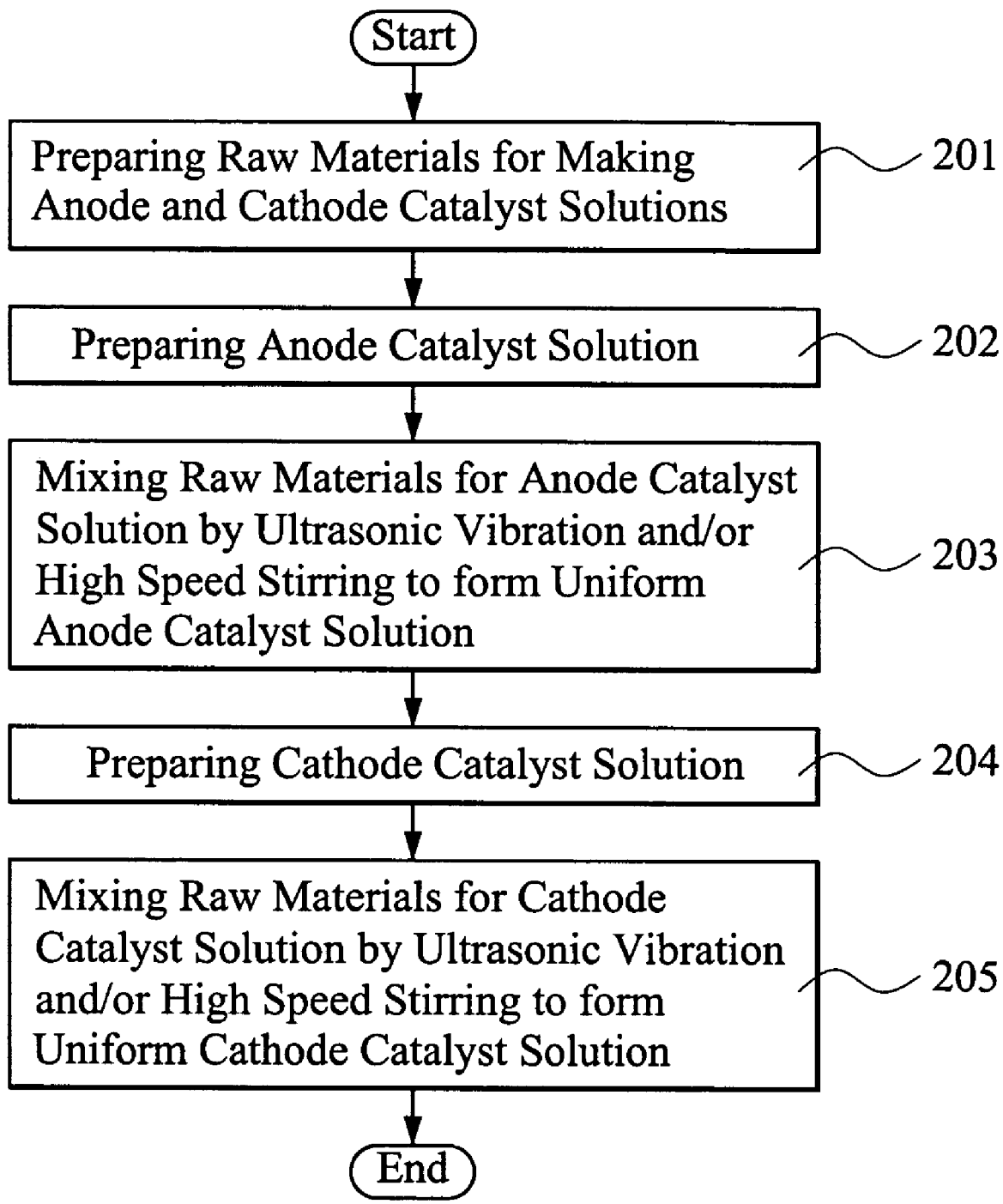
FIG. 4 is a flow chart illustrating a preparation process of catalyst solutions in accordance with the present invention.

FIG. 4 illustrates the process of preparing catalyst solutions. In step 201, raw materials for making the catalyst solutions are prepared. In an embodiment of the present invention, which takes a DMFC as an example, the catalyst solutions are made of Nafion solution Se-5112 obtained from Du Pont Corporation and Pt—Ru—C obtained from Johnson Matthey Co. for anode catalyst and Pt—C for cathode catalyst. In an application of PEMFC, the anode catalyst includes Pt—C, and the cathode catalyst also includes Pt—C.

To prepare the anode catalyst solution, step 202, one gram of nano-sized catalyst powders at a ratio of 2:1:2 for Pt—Ru—C is put into a flask and added with 4–8 ml Nafion solution, which is then subject to ultrasonic vibration and/or high speed stirring to form a uniform mixture, serving as anode catalyst solution, step 203. To prepare the cathode catalyst solution, step 204, one gram of nano-sized catalyst powders at a ratio of 1:1 for Pt—C is put into a flask and added with 4–8 ml Nafion solution, which is then subject to ultrasonic vibration and/or high speed stirring to form a uniform mixture, serving as anode catalyst solution, step 205.

Figure 5:
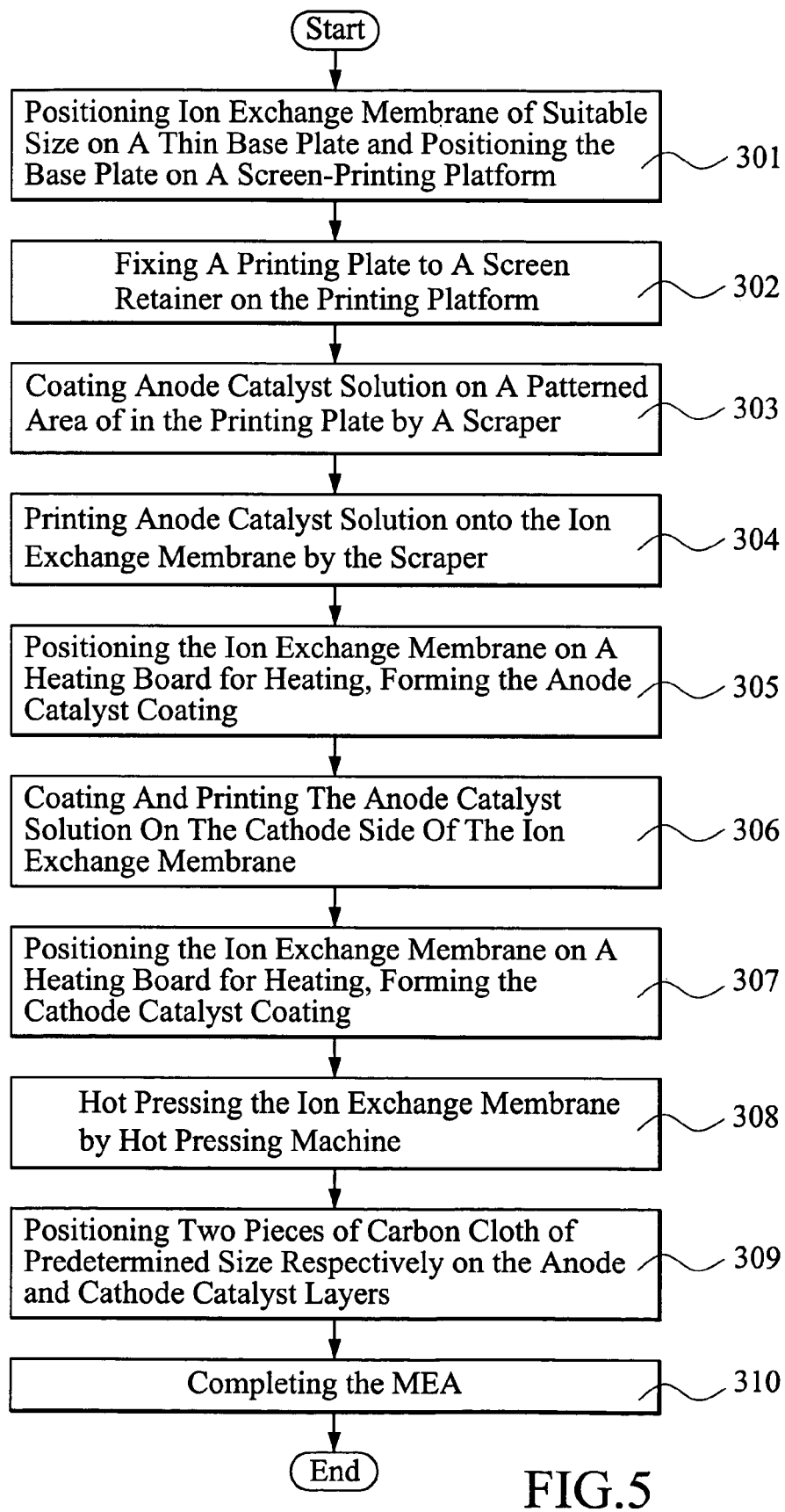
FIG. 5 is a flow chart illustrating a manufacturing process of a membrane electrode assembly in accordance with the present invention.

Once the ion exchange membrane cleaning process and the catalyst solution preparation process are done, the manufacturing process of the MEA starts, of which a flow chart is shown in FIG. 5.

An ion exchange membrane that is trimmed to a suitable size is properly cleaned. The ion exchange membrane is positioned on a thin base plate made of stainless steel (step 301) and the base plate with the ion exchange membrane thereon is positioned on a screen-printing platform. In an embodiment of the present invention, the ion exchange membrane is trimmed to a size of 7 cm×7 cm and is positioned on a base plate made of stainless steel having a surface area of 8 cm×8 cm and a thickness of 0.2 mm.

A steel screen plate of 0.05–0.3 mm pitch and 30–160 mesh or a steel plate having a predetermined width and gap is employed as a printing plate for performing printing operation. The printing plate is fixed to a screen retainer on the printing platform, step 302. The anode catalyst solution is uniformly coated on a patterned area of 5 cm×5 cm in the printing plate by a scraper, step 303. The anode catalyst solution is then transferred and printed onto the ion exchange membrane positioned on the base plate by the scraper, step 304.

Upon printing of the anode catalyst solution is performed, the ion exchange membrane absorbs solvent that comprises the anode catalyst solution and gets swelled. The ion exchange membrane is positioned on a heating board after the printing operation, step 305. The ion exchange membrane and the anode catalyst solution are heated to about 70–80° C. for 1–5 minutes. The heat that is applied to the ion exchange membrane facilitates evaporation of the solvent from the ion exchange membrane, thereby removing the solvent out of the ion exchange membrane. The heat also facilitates to cure the catalyst solution. In practice, only minor swelling of the ion exchange membrane occurs during the heating process and soon the ion exchange membrane gets straightened and flattened. No cracking of the catalyst layer is observed on the heat-treated ion exchange membrane.

An anode catalyst layer is thus formed on one surface (anode side) of the ion exchange membrane once the ion exchange membrane gets straightened and flattened. A similar process is employed on the cathode side of the ion exchange membrane, step 306, which repeats steps 301–304, but with the anode catalyst replaced by cathode catalyst, to form the cathode catalyst layer.

Once the cathode catalyst solution is printed on the cathode side surface of the ion exchange membrane, the ion exchange membrane is positioned on a heating board (step 307), and the ion exchange membrane and the cathode catalyst solution are heated to about 70–80° C. for 1–5 minutes. This forms the cathode catalyst coating on the ion exchange membrane.

Once the anode and cathode catalyst layers are completed, the ion exchange membrane is fed into a hot pressing machine for hot pressing, step 308, in which the ion exchange membrane is subject to a pressure of about 20–100 kgf/cm$^2$ at a temperature of about 110–140° C. for 1–3 minutes.

After the hot pressing operation, with the anode and cathode catalyst layers formed on the opposite side surfaces of the ion exchange membrane, two pieces of carbon cloth having a size of 5 cm×5 cm are positioned, respectively, on the anode and cathode catalyst layers, step 309, to serve as anode gas diffusion layer and the cathode gas diffusion layer. The membrane electrode assembly is thus completed (step 310).

In the embodiment just described, the anode catalyst layer is formed first by means of printing and heating, yet it is possible to form the cathode catalyst layer before the anode catalyst layer or alternatively, the anode and cathode layers can be printed and heated at the same time. In other words, the sequence of the formation of the anode and cathode catalyst layers is of no concern in the present invention.

The method for manufacturing MEA by printing in accordance with the present invention has advantages including at least:

(1) Stable process: Due to the screen printing technique employed, the catalyst coating that is formed by scraping has a substantially uniform thickness, as well as uniform porosity. Local thickness variation is thus minimized and area and thickness can be well controlled. Drawbacks of the conventional techniques, such as repeated coating, variable cycle time of manufacturing and non-uniform thickness, may not occur.

(2) Process automatization: The screen for printing can be selected for different pitch and mesh in order to print catalyst solution of different thickness and to realize control over number of layers of catalyst and thickness of printing. This allows automatization of the MEA manufacturing process.

(3) Eliminating swelling and cracking of catalyst layer of MEA: The catalyst solution, after being printed on the ion exchange membrane, is immediately subject to heating, which helps removing the solvent absorbed in the ion exchange membrane, as well as facilitating to cure the catalyst solution. Thus, only minor swelling may occur during the printing process and it soon gets flattened. No cracking of the catalyst coating may happen. This makes the MEA so manufactured of high quality.

Although the present invention has been described with reference to the preferred embodiment thereof and the best mode for carrying out the present invention, it is apparent to those skilled in the art that a variety of modifications and changes may be made without departing from the scope of the present invention which is intended to be defined by the appended claims.

What is claimed is:

1. A method for manufacturing a membrane electrode assembly of a fuel cell, comprising the following steps:
   (a) preparing an ion exchange membrane with a predetermined size, and preparing anode and cathode catalyst solutions, the step of preparing an ion exchange membrane includes the steps of:
      (i) rinsing the ion exchange membrane in pure water at 80° for one hour;
      (ii) washing the ion exchange membrane in 1M hydrogen peroxide solution at 80° C. for one hour;
      (iii) rinsing the ion exchange membrane in pure water at 80° C. for one hour;
      (iv) positioning the ion exchange membrane in 1M sulfuric acid solution at 80° C.; and
      (v) rinsing the ion exchange membrane two or three times with pure water at 80° C.;
   (b) positioning the ion exchange membrane of the predetermined size on a base plate, which is then mounted to a screen-printing platform;
   (c) mounting a printing plate to a screen retainer of the platform;
   (d) coating the catalyst solutions on a patterned area of the printing plate with a scraper and printing the catalyst solutions onto the ion exchange membrane positioned on the base plate with the scraper;

(e) positioning the ion exchange membrane on a heating board for heating; and (f) curing the catalyst solution and waiting for the ion exchange membrane to get flattened and thereby forming uniform coatings of the catalysts on the ion exchange membrane.

2. The method as claimed in claim 1, wherein the anode catalyst solution is coated on an anode side surface of the ion exchange membrane and heated first and then the cathode catalyst solution is coated on a cathode side surface of the ion exchange membrane and heated.

3. The method as claimed in claim 1, wherein the cathode catalyst solution is coated on a cathode side surface of the ion exchange membrane and heated first and then the anode catalyst solution is coated on an anode side surface of the ion exchange membrane and heated.

4. The method as claimed in claim 1, wherein the anode and cathode catalyst solutions are respectively coated on anode and cathode side surfaces of the ion exchange membrane and heated together.

5. The method as claimed in claim 1, wherein the anode catalyst solution comprises Pt—Ru—C and the cathode catalyst solution comprises Pt—C.

6. The method as claimed in claim 1, wherein the anode catalyst solution comprises Pt—C and the cathode catalyst solution also comprises Pt—C.

7. The method as claimed in claim 1, wherein the ion exchange membrane is heated by the heating board to a temperature of about 70–80° C. for 1–5 minutes.

8. The method as claimed in claim 1 further comprising a step of hot pressing the ion exchange membrane after step (f).

9. The method as claimed in claim 8, wherein the hot pressing is performed by applying a pressure of about 20–100 kgf/cm$^2$ to the ion exchange membrane at a temperature of about 110–140° C. for 1–3 minutes.

10. The method as claimed in claim 9 further comprising a step of positioning of pieces of carbon cloth having a predetermined size on each of the anode and cathode coatings of the ion exchange membrane after the hot pressing, the pieces of carbon cloth serving as anode and cathode gas diffusion layers for the ion exchange membrane.

11. The method as claimed in claim 1, wherein the printing plate comprises a screen having predetermined pitch and mesh.

12. The method as claimed in claim 1, wherein the printing plate comprises a steel plate of predetermined width and gaps.

* * * * *